No. 858,451. PATENTED JULY 2, 1907.
E. HAEFELY.
MACHINE FOR MAKING INSULATING TUBES.
APPLICATION FILED MAY 2, 1906.

2 SHEETS—SHEET 1.

WITNESSES:
C. L. Belcher
Otto S. Schairer

INVENTOR
Emil Haefely
BY
Okley G. Carr
ATTORNEY

No. 858,451. PATENTED JULY 2, 1907.
E. HAEFELY.
MACHINE FOR MAKING INSULATING TUBES.
APPLICATION FILED MAY 2, 1906.

2 SHEETS—SHEET 2.

WITNESSES:
C. L. Belcher
Otto S. Schairer

INVENTOR
Emil Haefely
BY
ATTORNEY

UNITED STATES PATENT OFFICE.

EMIL HAEFELY, OF BASEL, SWITZERLAND, ASSIGNOR TO WESTINGHOUSE ELECTRIC & MANUFACTURING COMPANY, A CORPORATION OF PENNSYLVANIA.

MACHINE FOR MAKING INSULATING-TUBES.

No. 858,451.   Specification of Letters Patent.   Patented July 2, 1907.

Application filed May 2, 1906. Serial No. 314,910.

*To all whom it may concern:*

Be it known that I, EMIL HAEFELY, a citizen of the Republic of Switzerland, and a resident of Basel, in Switzerland, have invented a new and useful Improvement in Machines for Making Insulating-Tubes, of which the following is a specification.

My invention relates to machines for making insulating tubes and it constitutes an improvement upon the machine set forth and claimed in my application Serial No. 223,442, filed September 26, 1904.

The object of my invention is to provide means for insuring the feeding of insulating fabric, such as paper to a winding mandrel in such manner as to avoid all irregularities in such material and thus tend to insure the production of tubes of uniform dimensions and homogeneous composition.

Figure 1:
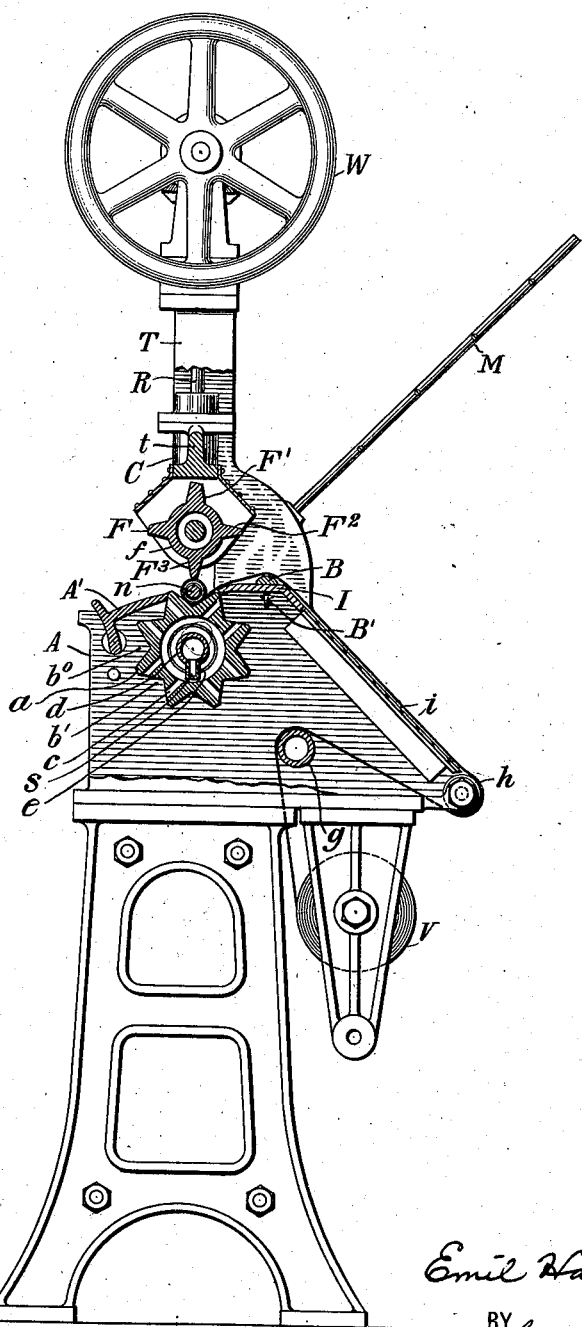
Figure 2:
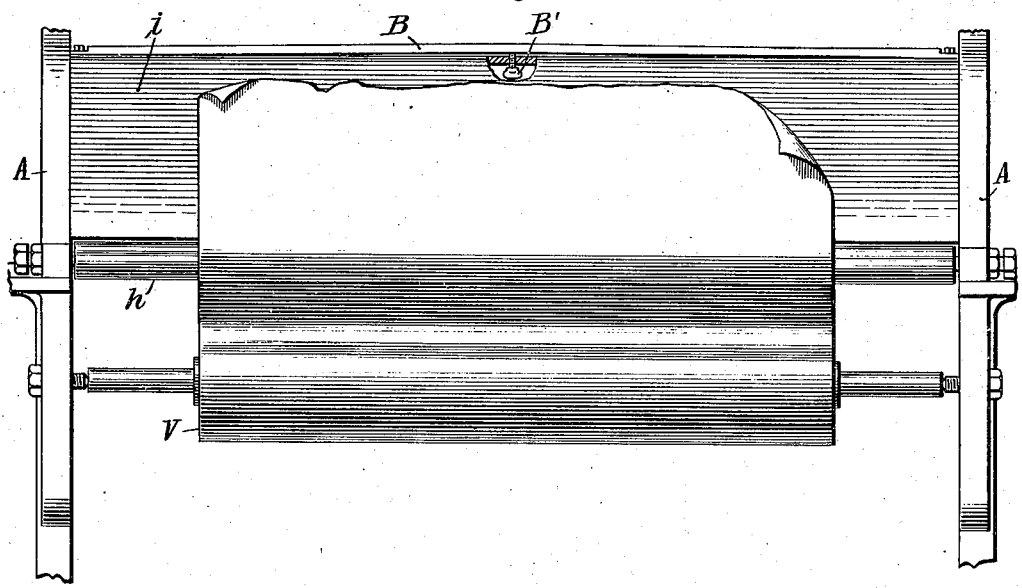

In the accompanying drawing, Figure 1 is a view, partially in side elevation and partially in section, of a machine embodying my invention, and Fig. 2 is a front elevation of a portion of the machine shown in Fig. 1.

Mounted in a suitable frame A is a mandrel holder $a$ the surface of which is provided with eight longitudinal recesses which are of angular or substantially V shape in cross-section and which extend the entire length of the holder parallel to its axis and are designated by the letters $b°$ $b'$, the recesses $b°$ being of the same shape and dimensions as the recesses $b'$ but alternating in position therewith. The interior of the mandrel holder $a$ communicates with the exterior by means of passages $c$ which are uniformly spaced and the outer ends of which terminate in the recesses $b'$. The recesses $b°$, any one of which may be utilized for holding a mandrel, have polished surfaces, while the surfaces of the recesses $b'$ may be unfinished. Any suitable means may be employed for locking the mandrel holder in the position to which it is rotatively adjusted. A gas pipe $d$ extends through the interior of the mandrel holder $a$ and is supported in the ends thereof, suitable connections being made to one end thereof by means of a supply hose (not shown). The pipe $d$ is provided with small branch tubes $s$ having lateral openings $e$. Above the mandrel holder $a$ is located a pressure device $f$, which is rotatively adjustable and is provided with a plurality of longitudinal ribs or flanges F, $F^1$, $F^2$ and $F^3$ the edges of which are slightly chamfered or beveled in order that the material may not be injured as it is wound upon the mandrel. The pressure device $f$ is supported by a cross bar $t$ which is free to move vertically in guides provided in the standards T of the frame A, suitable gearing being provided for raising the said cross bar when the pressure device is not in use.

A roll of paper or other fabric which constitutes one of the principal elements of my product is supported in suitable bearings in the frame A, as indicated at V, and the paper drawn therefrom passes over a tension roller $g$, a guide roller $h$ and a table $i$ to a mandrel $n$ of the proper size which rests in the upper recess $b°$ of the mandrel holder. On account of the tendency of the paper or other fabric to stretch more at the edges than at the intermediate portions of the sheet, I provide the frame A with a bar B having a curved upper surface and fasten its ends to the frame between the table $i$ and the mandrel. Beneath approximately the middle point of the bar B, I locate a screw B', by means of which the bar may be bowed upwardly between its ends a sufficient amount to compensate for the difference in elongation between the edges and the intermediate portions of the fabric. As the paper or other fabric is drawn from the roll V over the table $i$, it is provided with a coating of varnish or other suitable binder and the free end is wound close around the mandrel, after which the mandrel is rotated at the speed desired, either mechanically or by hand, in a clockwise direction, so as to apply the fabric with the varnish coating between successive layers. As soon as a single layer of material is wound upon the mandrel and the latter is placed in the recess $b°$, the pressure device $f$ is lowered until the entire weight of it and the bar $t$ rests upon the material on the mandrel. Inasmuch as the recess $b°$ is of angular or V shape in cross-section and the pressure exerted from above is uniform and constant, the progressively increasing diameter of the tube, as it is formed, does not effect any variation in the degree of density of the material.

While the device manufactured by my machine may consist solely of paper or other suitable fabric and varnish, I prefer to combine mica therewith, and, when so combined, thin sheets of mica are placed upon the coating of varnish as it passes to the mandrel. For the purpose of supporting the sheets of mica as they are fed to the mandrel, I may provide the frame A with a guide rack M of light, skeleton structure. While the guide rack is a useful device, it is not essential, either in the form shown or otherwise. Inasmuch as the varnish is heated to a comparatively high temperature in passing over the heated portion I of the frame, all volatile constituents are driven off, leaving a layer of uniform consistency and without air bubbles or other particles which might serve to impair the quality of the insulating tube when completed. On account of the continuously applied uniform pressure, no varnish in excess of the amount required as a binder can remain upon the fabric as it is wound upon the mandrel and a tube of absolute uniformity as to consistency and dimensions and having extraordinary insulating qualities and durability is therefore produced.

I claim as my invention:

1. In a machine for making tubes from sheet material, the combination with a frame, of a mandrel, a mandrel holder, a pressure device, a compensating member having a surface which the sheet material engages as it is fed to the mandrel, and means for producing such longitudinal curvature of said surface as may be desired.

2. In a machine for making tubes from sheet material, the combination with a frame, of a mandrel, a mandrel holder, a pressure device, a compensating bar having its ends fastened to the frame in front of the mandrel holder and means for raising and lowering the middle portion of said bar.

3. In a machine for making tubes from sheet materials, the combination with a frame, of a mandrel, a mandrel holder, a pressure device, and a compensating device comprising a bar of curved cross-section having its ends fastened to the frame and means for raising and lowering the middle of the bar.

4. In a machine for making tubes from sheet materials, the combination with a frame, of a mandrel, a mandrel holder, a pressure device, and a compensating device comprising a bar of curved cross-section fastened at its ends to the frame and a screw for raising and lowering the middle of the bar.

In testimony whereof, I have hereunto subscribed my name this 30th day of April, 1906.

EMIL HAEFELY.

Witnesses:
WESLEY G. CARR,
BIRNEY HINES.